March 14, 1939.  E. H. PIRON  2,150,630
MAGNETIC BRAKING SYSTEM
Filed March 19, 1936  2 Sheets-Sheet 1
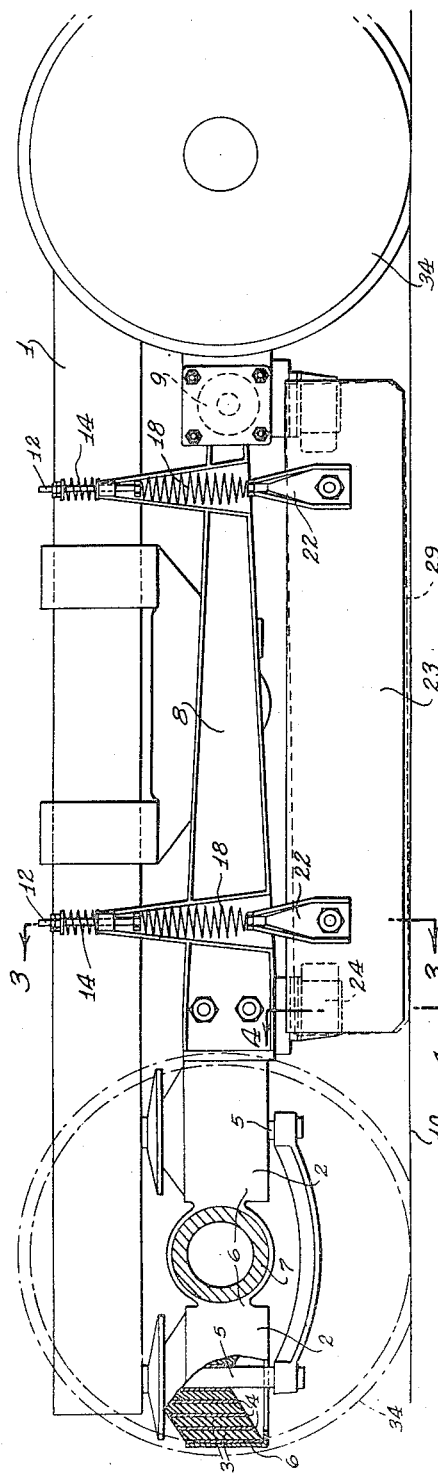
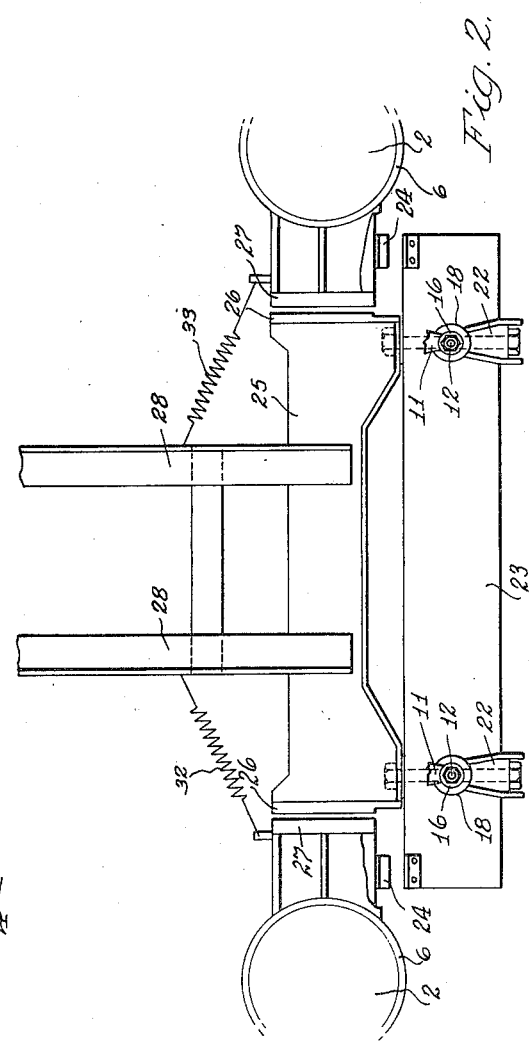
INVENTOR.
Emil H. Piron
BY
ATTORNEY.

March 14, 1939.  E. H. PIRON  2,150,630
MAGNETIC BRAKING SYSTEM
Filed March 19, 1936   2 Sheets-Sheet 2
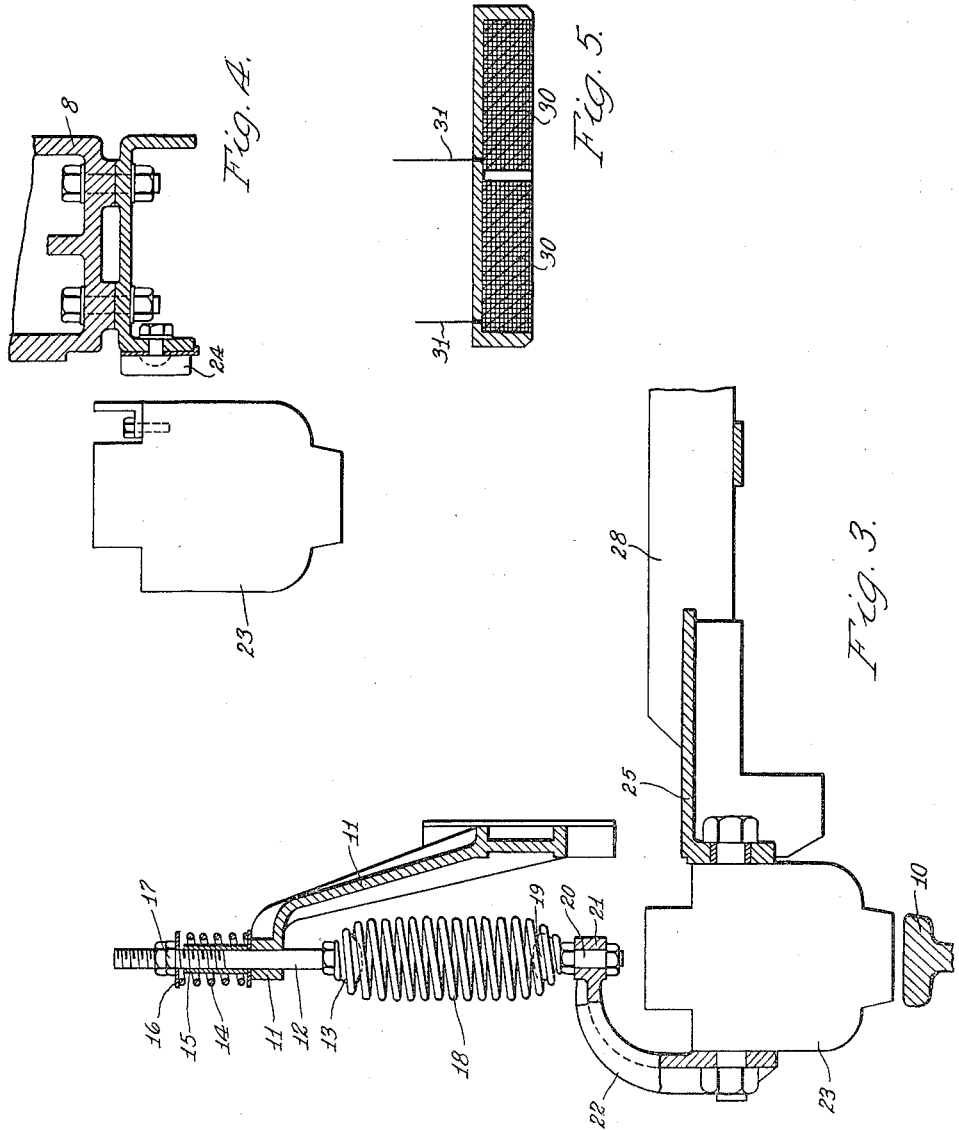
INVENTOR.
Emil H. Piron
BY J Windsor Davis
ATTORNEY.

Patented Mar. 14, 1939

2,150,630

UNITED STATES PATENT OFFICE 2,150,630

MAGNETIC BRAKING SYSTEM

Emil H. Piron, New York, N. Y., assignor to Transit Research Corporation, New York, N. Y., a corporation of New York Application March 19, 1936, Serial No. 69,636

11 Claims. (Cl. 188—165)

This invention relates to magnetic track brakes and has for its object to provide an improved means for supporting the brake shoes thereof from a rail truck and with respect to each other.

It is usually necessary in trucks of conventional design to suspend track brake shoes from the truck frame which is separated from the rails through journal springs. The result is that the shoes must be elevated well above the tracks when not in use for braking. In order to traverse the shoes through this substantial distance rather complicated mechanisms including compressed air systems and spring devices are generally used. Drawbacks to such actuating mechanisms are that the braking pressures are transmitted to the frame through leverages or through parts subjected to severe bending forces; that friction with the shoe guides interferes with rapid response of the brakes to the will of the operator; high cost of installation, and danger of breakage of parts improperly situated. It is therefore an object of this invention to provide a truck having unsprung track brake supporting members which travel at a substantially constant elevation above the tracks and to suspend the brakes from these members by springs whereby the elevation of the brake shoes above the tracks may be reduced to an amount such that the magnetism between the shoes and the rails, upon energization of the shoes, will draw the shoes to the rails without the necessity of pneumatic or mechanical lowering means.

Another object is to provide fore and aft abutments, also carried by an unsprung member of the truck, for pushing said shoes along the rails when in track-contacting position and to space these abutments in an amount substantially greater than the length of the shoes so that binding of the shoes therewith can not ordinarily occur even though the shoes may tilt somewhat during lowering movement. The abutments therefore are not guide members in the usual sense and the shoes are susceptible to wandering from a maximum contact with the rail. It is another object to rigidly connect the two shoes of each truck in order that each will have a steadying influence upon the other.

In a construction as herein contemplated in which magnetization of the shoes alone causes rail contact, it will be appreciated that the pull-down force exerted between the track and the shoes varies approximately according to the square of the distance therebetween. In other words, the magnetic attraction is weakest when the shoes are furthest from the rails and increases rapidly as the distance is decreased. The result is that if very stiff suspension springs are used the attraction will not be great enough to overcome their resiliency and if soft springs are used the impact of the shoes with the rails will be very severe and sudden with a consequent noise and sudden, discomforting retardation of the truck. It is therefore another and important object of this invention to provide a spring shoe suspension which will offer comparatively small resistance to initial shoe movement and very substantially greater resistance to final rail contacting movement.

When the shoes are in suspended position they are more or less free to swing laterally and longitudinally. These swinging movements may increase to the point where the shoes or their connecting members make noisy contact with the truck frame. It is therefore a further object to provide means for cushioning such lateral movements and means for yieldingly opposing such longitudinal movements in order to preclude noise emission from this cause.

It is a further object to lessen the tendency toward sudden retardation upon contact of the shoes and the rails. As will be explained this is effected by tilting the shoes during depression in any one of several ways.

Other objects and advantages will become hereinafter more fully apparent as reference is had to the accompanying drawings wherein my invention is illustrated and in which Figure 1 is a side elevation, with one wheel removed, of a truck equipped with my invention, Figure 2 is a top plan view of one side of the truck of Figure 1, Figure 3 is a vertical section taken along the lines 3—3 of Figure 1, Figure 4 is a vertical section at the line 4—4 of Figure 1, and Figure 5 is a vertical section through a modified form of track brake shoe.

1 indicates the main frame of a rail truck which is supported at each corner by journal springs 2. These springs, as illustrated, are composed of alternate concentric cylinders of rubber 3 and metal 4 with each innermost member 5 being rigidly secured to a side rail of the frame 1 and the exterior metallic members 6 being rigidly connected in pairs to the main journal bearings 7. Rigidly connected with one member 6 of each pair of journal springs is a torque arm 8 articulated intermediate its ends at 9, the point of articulation being very considerably closer to one member 6 than to the other. This torque arm construction is equivalent to that shown and described in my copending application Serial Number 24,190 filed May 31, 1935. It will be seen that these arms 8, 9 are unsprung and hence they do not vary in elevation with respect to the tracks 10 in the same manner as if they were sprung from the journal springs.

Projecting upwardly and outwardly from each arm 8, 9 are track brake shoe hangers 11, suitably two in number for each torque arm. Each hanger 11 has an eye at its outer end for the insertion of an elongated bolt 12 having a rounded head 13. A compression spring 14 encircles the upper end of each bolt 12 and a stop collar 15 for limiting the possible deflection of the spring 14 is placed between this spring and the bolt. A retainer 16 acts as an abutment for the upper end of the spring 14 and is retained in place by the nut and lock nut 17 which are adjustable on the bolt 12 to vary the initial compression imparted to the spring 14.

The rounded end 13 of each bolt is enveloped by a closely fitting tension spring 18, the lower end of each of which springs closely envelops the rounded head 19 of a further bolt 20 extending through the eye 21 of a bracket 22 rigidly secured to the brake shoe 23.

The shoes 23 may be of conventional design as is well understood in the art and hence are not illustrated in detail. They each contain electrical coils which upon energization render the coil casings magnetic whereby they have an attraction for the metallic tracks 10. In this case the shoes are suspended sufficiently close to the rails in elevated position that the magnetic attraction caused by energization of the coils serves as the pull-down force of the shoes to the rails.

With the construction described it will be noted that the springs 14 and 18 constitute the sole means for supporting the shoes from the hangers 11. The lateral swinging movements of the shoes may become sufficiently great to cause contact with the torque arms 8 or other truck part and cushions 24 of rubber or other suitable material are provided to cushion the impact and deaden the noise thereof.

A spring 32 connected at one end to the abutment 27 which is expected to be in aft position and at its other end to a member 28 rigid with the brake shoes yieldingly opposes fore and aft free swinging movements of the shoes between the abutments 27.

Each shoe is secured to a driving member 25 with squared ends 26 for contact by the abutments 27 carried by the spring member 6. When the shoes are energized and are consequently drawn to the rails they are driven or pushed by the aft abutments 27. If the truck is running in reverse or is otherwise being normally driven in a direction such that the abutment 27 to which the spring 32 is attached is not in aft position the shoes will lag behind their positions vertically below their elevated positions until they contact the other abutments 27. The springs 14 and 18, in this event, deflect still further after contact of the shoes with the rails by an amount proportionate to the amount of lag. While the preferred arrangement is as described it is also acceptable to provide springs 33 at each side of the truck connecting a member 28 with the other abutment 27, these springs 33 being identical in characteristics with the springs 32. The effect of this is to cause the shoes to be free from contact with either abutment 27 when suspended and hence to eliminate friction with the abutments during lowering. The springs 32 and 33 yieldingly oppose longitudinal swinging movements of the shoes and there will be an amount of lag behind the elevated position after rail contact, as above described. In both cases the members 28 are cross members which rigidly connect the shoes on opposite sides of the truck whereby each shoe exerts a steadying influence on the other.

As aforesaid, the magnetic attraction of the energized shoes for the rails constitutes the pull-down force. Magnetic attraction varies approximately with the square of the air gap so that the force builds up rapidly as the shoe approaches the rails. The result tends to be a sudden and discomforting retardation of the truck. In order to compensate for this force build-up the springs 14 and 18 are so proportioned and arranged that after initial depression of the shoe the retainers 16 bottom against the collars 15 and thereafter the springs 18 continue to resist further downward movement of the shoes. The result is small resistance to initial depressing movement and substantially increased resistance to final depressing movement since the arrangement is, in effect, that of a spring having an increasing load deflection ratio. In other words, the combined load deflection ratio of the two sets of springs is less than that of either set 14 or 18 and the ratio will increase to that of the springs 18 after the springs 14 are out of action. The springs 18 may therefore be harder, equal to or softer than the springs 14 but I prefer that the springs 14 have a load deflection ratio approximately one-third as great as that of the springs 18. It will be noticed also that upon deenergization of the shoes the springs 18 will quickly lift the shoes and that the lifting force materially decreases as the shoes approach their elevated positions of inoperation.

It is an advantage in cushioning this initial shock of deceleration if the shoe contacts the rail at one end first rather than simultaneously over its entire surface. This effect, as indicated by the dotted lines 29 of Figure 1, may be obtained for instance by making the springs 18 at one end of the shoe slightly weaker than those at the other end. Or it may be obtained by making the shoes slightly heavier at one end than at the other. Or it may be obtained by making the springs 32 sufficiently stiff to create a substantial amount of friction between the contacted abutments 27 and the shoes during lowering movement. Or it may be obtained by varying the magnetization of one end of the shoe with respect to the other. In Figure 5 the interior of a shoe is diagrammatically illustrated showing more than one coil 30. Each coil has a separate line 31 so that energization may be individually controlled. Thus, initially, if the coil at one end is energized it will cause the shoe to tilt during depression. The other coil may then be energized automatically upon contact of the rail with the shoe or the operator may subsequently affect its energization.

In the foregoing description the torque arms 8, 9 have been described as unsprung. This should be understood as referring to the journal springs and not in the such strict sense as to preclude the wheels 34 from being of resilient type. Resilient rail wheels do not permit of sufficient deflection, in practice, to interfere and may be used, if desired, without altering the described operation to any amount which warrants recognition herein.

What I claim is:

1. The combination of a rail truck, track brake shoes supported from said truck, means for depressing said shoes into track contacting position, and spring means for resisting movement of said shoes toward the tracks, said spring means having a load deflection ratio which increases during final movement of said shoes into contact with said tracks.

2. The combination of a rail truck, track brake shoes, spring means for supporting said shoes from said truck above tracks, said shoes being connected to a source of electrical energy, said shoes upon energization having a magnetic attraction for said tracks constituting the sole means for depressing said shoes into contact with said tracks, and means offering small resistance to initial movement of said shoes toward said tracks and resistance according to an increased load deflection ratio to final movement of said shoes into track contacting position.

3. The combination of a rail truck, track brake shoes, spring means for supporting said shoes from said truck above tracks, said shoes being connected to a source of electrical energy, said shoes upon energization having a magnetic attraction for said tracks constituting the sole means for depressing said shoes into contact with said tracks, said spring means constituting resistance to the depression of said shoes, said spring means having a load-deflection ratio which increases as said shoes approach said tracks during depression.

4. The combination of a rail truck, magnetic track brake shoes, and spring means for supporting said shoes from said truck above tracks, said spring means comprising sets of multiple springs, and means for precluding deflecting movement of one spring of each of said sets during final movement of said shoes into track contacting position.

5. The combination of a rail truck, magnetic track brake shoes, and spring means for supporting said shoes from said truck above tracks, said spring means comprising sets of multiple springs, each of said sets comprising a tension spring and a compression spring, said compression springs being adapted to bottom upon initial lowering movement of said shoes towards said tracks whereby the latter portion of said lowering movement is resisted solely by said tension springs.

6. The combination of a rail truck, magnetic track brake shoe construction comprising a pair of oppositely disposed shoes, spring means supporting said shoes from said truck, abutments carried by said truck fore and aft of said shoes against one of which each of said shoes contacts for impulsion when in rail contacting position, and spring means attached at one end to said construction and at their other end to said abutments as a means for steadying said construction when said shoes are in elevated position.

7. The combination of a rail truck, magnetic track brake shoe construction, spring means supporting said construction from said truck, abutments carried by said truck fore and aft of said construction against one of which a part of each of said construction contacts for impulsion thereby, said abutments being spaced apart a distance substantially greater than the distance between said parts whereby said constructions are capable of lateral and longitudinal swinging movements, cushion means carried by the truck for yieldingly limiting the amount of such lateral swinging movements and spring means connecting said construction and said abutments to resist fore and aft swinging movements of said shoes with respect to said abutments.

8. The combination of a rail truck, magnetic track brake shoes supported from said truck immediately above tracks, said shoes upon energization having a magnetic attraction for said tracks constituting the sole pull-down force for said shoes, and means for causing said shoes to tilt during depression to said rails whereby the initial contact of said shoes with said rails is over a comparatively small portion of the total track contacting surface of said shoes.

9. The combination of a rail truck, magnetic track brake shoes, and springs near the ends of said shoes for supporting said shoes from said track immediately above tracks, said shoes upon energization having a magnetic attraction for said tracks constituting the sole pull-down force for said shoes, the springs at one end of each of said shoes being weaker than the springs at the other end thereof whereby said shoes tilt during travel toward said tracks.

10. The combination of a rail truck, magnetic track brake shoes, a spring supporting each end of each of said shoes from said truck, said shoes each containing a plurality of windings arranged longitudinally therein, and means for energizing the windings toward one end of each of said shoes to a greater degree than the remainder thereof whereby said shoe tilts during depression thereof into track engaging position.

11. In combination, a rail truck comprising axles, a frame sprung on said axles and unsprung torque resisting arms connecting said axles, magnetic track brake shoes, springs constituting the sole means for supporting said shoes from said unsprung arms above tracks, said shoes upon energization having attraction for said tracks constituting the sole pull-down force therefor, unsprung abutments on said truck aft of said shoes constituting means for impelling said shoes along said tracks after depression thereto, and cross members rigidly connecting together the shoes of opposite sides of said truck.

EMIL H. PIRON.